United States Patent [19]

O'Connell

[11] 4,016,802

[45] Apr. 12, 1977

[54] SCRIBING TOOL

[75] Inventor: Gerard P. O'Connell, Holyoke, Mass.

[73] Assignee: Baltimore Brushes, Inc., Boston, Mass. ; a part interest

[22] Filed: Oct. 6, 1975

[21] Appl. No.: 619,623

[52] U.S. Cl. .................................. 90/12 R; 310/50; 15/23; 33/18 R; 51/170 PT; 30/DIG. 1

[51] Int. Cl.$^2$ .......................................... B23C 1/20

[58] Field of Search ....... 30/164.9, 164.95, DIG. 1; 81/9.2; 83/12; 144/1 E; 15/22 R, 23, 24, 28, 29; 310/50; 90/12; 408/124; 51/170 PT; 33/18 R

[56] References Cited

UNITED STATES PATENTS

| | | | |
|---|---|---|---|
| 2,963,598 | 12/1960 | Kent | 30/DIG. 1 |
| 3,183,538 | 5/1965 | Hubner | 15/22 R |

*Primary Examiner*—Charles E. Phillips
*Attorney, Agent, or Firm*—Ross, Ross & Flavin

[57] ABSTRACT

A battery-operated scribing tool wherein an elongated casing defines a handle with an interior cavity serving as a battery chamber and with an opening at the outboard end leading to the cavity. A pair of spring-biased batteries are in-line receivable in the cavity and are secured in situ by a hollow head or motor housing having a rearward end sleevably received over the forward end of the casing so as to be snugly held relative thereto. A motor is nestably received within the head hollow. A slot in the head side wall allows manual actuation of the outboard free end of a switch bus extendable along the cavity wall and along the wall of the hollow of the head with a biasable extremity extending into the slot. An etching means projects outwardly from the motor and through an opening in the outboard end of the head and may be sleeved through a coupling adjacent the head opening.

1 Claim, 7 Drawing Figures

SCRIBING TOOL

Scribing or etching tools heretofore known have usually included usually large and bulky casings which have housed electromagnets wired to outside sources of energy supply. The bulkiness has led to structures which are objectionably cumbersome and difficult to handle and use.

The primary objective of this invention is to provide a writing instrument which resembles more closely than anything heretofore available an instrument of the type with which people are familiar, which instrument contains its own power unit, and is made of numerous relatively simple parts so as to be inexpensive in its production.

Another object hereof is to provide a novel elongated etching tool so constructed that the instrument as a whole simulates a pencil or other writing instrument which includes a readily accessible means for placement of the tool into operative position.

Figure 1:
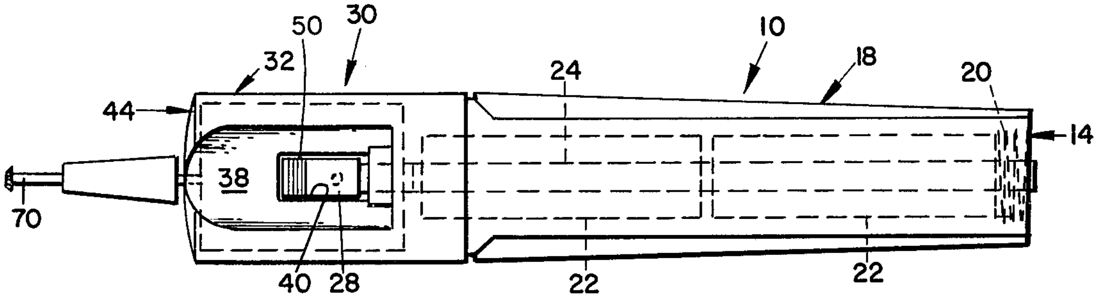
FIG. 1 is a top plan view of the assembled tool.
Figure 3:
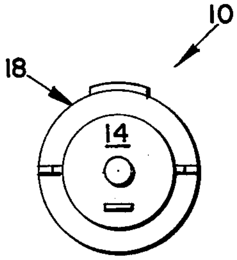
FIG. 3 is an end elevational view of the FIG. 2 casing looking toward the right hand end thereof.
Figure 2:
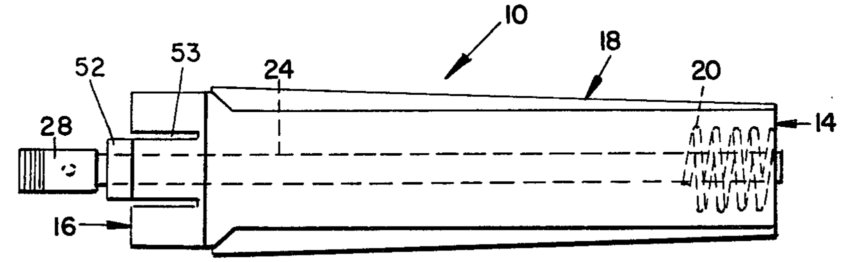
FIG. 2 is a top plan view of the casing.
Figure 5:
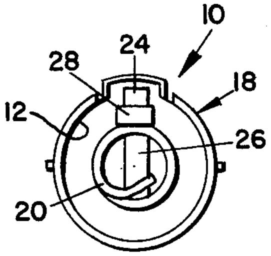
FIG. 5 is an end elevational view of the FIG. 4 casing looking toward the left hand end thereof.
Figure 4:
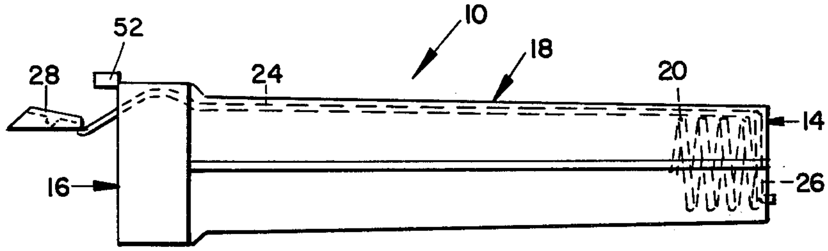
FIG. 4 is a side elevational view of the casing.
Figure 7:
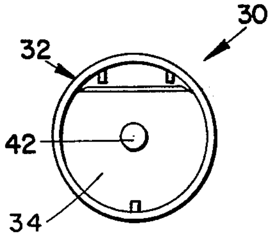
FIG. 7 is an end elevational view of the FIG. 6 head looking toward the right hand end thereof.
Figure 6:
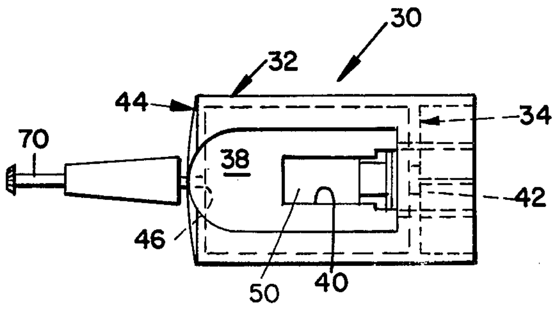
FIG. 6 is a top plan view of the head.

Turning now to the drawings, a scribing or etching tool embodying the invention has a casing 10 having an interior cavity 12 which is closed at its rearward end by an end wall 14 and open at its forward end by an opening 16 leading to the cavity.

Casing 10 is elongated and has a slightly tapered cylindrical wall 18 which defines a slender tool simulating a writing instrument and which may be easily grasped and manipulated by the user.

A spring 20 is seated within cavity 12 on the inner surface of end wall 14 and serves to bias the innermost in-line disposed of a pair of batteries 22 which are receivable within the cavity by the in seriatim insertion thereof through opening 16.

A switch bus 24 has an offset laterally-extending rearward tail 26 which seats on the rearward end face of spring 20 and a forward tail 28 extendable outboard of the casing and subsequently to be referred to.

A head or motor housing 30 has a tubular side wall 32 defining a hollow interior which is closed inboard of its rearward end by an apertured end wall 34.

A flat 38 is provided at one side of side wall 32 in which a through T-slot 40 leading to the hollow interior is cut.

A contact ring 42 is seated in a provided through opening in end wall 34.

At the opposite end of the head, a forward end wall 44 is provided with a central through opening 46 extending therethrough.

A motor 50 is nestably received within the motor chamber or hollow interior of head 30 so as to have a bearing relation with contact ring 42 in end wall 34, which motor is energized from the batteries in the battery chamber.

The forward tail 28 of switch bus 24 is so configured as to be extendable through the aperture in end wall 34 and having a free end portion extendable into slot 40.

When head 30 is sleevably engaged with casing 10, the free end of the switch bus is extendable through the slot so as to be biased between switch on and switch off positions, and detent 52 due to adjacent slots 53 can be biased upon insertion of the casing 10 into the rearward part of the motor housing 30 and detent 52 when the casing 10 and motor housing 30 are fully engaged will extend into the head portion of the T-slot 40.

An etching tool 70 preferably of carbide or other hard material projects outwardly from and has a driven relationship with motor 50 so as to be rotatable when the switch is in switch on position and to be non-rotatable when the switch is in switch off position.

The tool is adapted for grasping by the hand so that the outboard end of the etching tool, which is preferentially provided with a pointed end, may be rotated to permit markings to be etched by the tip on a hard surface such as metal or plastic.

Once the component parts are assembled, no fastening means is required to secure same together, the interlocking relationship of head and casing being insured by the configuration of the switch bus, the components all cooperating to provide a slender well balanced and powerful tool.

I claim:

1. A writing instrument comprising:

an elongated tubular casing having a hollow interior closed at its rearward end by a rearward end wall and opened at its forward end, a tubular motor housing having a hollow interior closed at its forward end by an apertured forward end wall and closed inboard of its rearward end by an apertured rearward wall;

the forward end of the casing being nestably receivable within the rearward end of the motor housing, a flat on the motor housing exterior having a through-slot leading to the motor housing interior, a motor nested within the motor housing interior, a power source nested within the casing interior, a spring seated within the casing interior adjacent the rearward end thereof in biasing relationship with the power source, a switch bus extendable in the casing and motor housing interiors through the aperture in the rearward and having an offset laterally-extending rearward tail seating against the spring and a forward tail extending outwardly through the aperture in the rearward wall of the motor housing and through the through-slot of the motor housing and biasable into and out of contacting relation with the motor in switch on and switch off positions respectively, a contact ring extendable through the rearward wall of the motor housing for interconnecting the motor and power source, and an etching tool projecting outwardly through said aperture of said forward end wall from and having a driven relationship with the motor for rotation when the switch bus is in switch-on position and non-rotation when the switch-bus is in switch-off position.

* * * * *